May 27, 1924.

H. E. LJUNGQVIST

TOOL HANDLE FASTENING

Filed July 19, 1922

1,495,558

Inventor
H.E.Ljungqvist
By Marks Clerk
Att'ys

Patented May 27, 1924.

1,495,558

UNITED STATES PATENT OFFICE.

HELGE EFRAIM LJUNGQVIST, OF MULLSJO, SWEDEN.

TOOL-HANDLE FASTENING.

Application filed July 19, 1922. Serial No. 576,098.

*To all whom it may concern:*

Be it known that I, HELGE EFRAIM LJUNGQVIST, a subject of the King of Sweden, and resident of Mullsjo, in the Kingdom of Sweden, merchant, have invented certain new and useful Improvements in Tool-Handle Fastenings, of which the following is a specification, reference being made to the accompanying drawing.

The present invention relates to a device for securing hammer heads or other tool members to handles of wood or the like. When employing a one or two-part wedge-shaped device for fastening a hammer or other tool member in place in a handle by driving such member in the end of the handle, inconvenience and difficulty is always experienced in removing the wedge-shaped device in instances where it is desired to remove the hammer head or other tool. This invention has for its object to remove this inconvenience in a simple manner. To this end the wedge-shaped holding device, which is composed of a plurality of parts, is so arranged that the wedge action of the same is reduced when one of its parts is driven into the handle past its ordinary functional position in the same, so that certain of the parts of the holding device can be taken out easily and thereafter the handle separated from the tool member.

Figure 1:
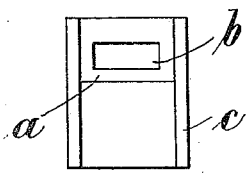
Figure 2:
Figure 3:
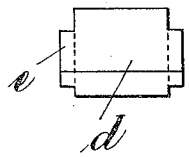
Figure 4:
Figure 5:
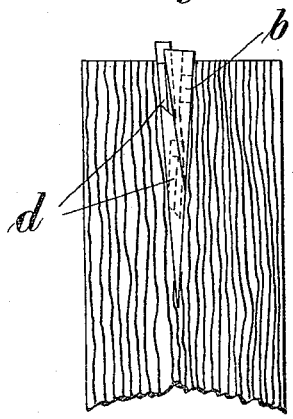
Figure 6:
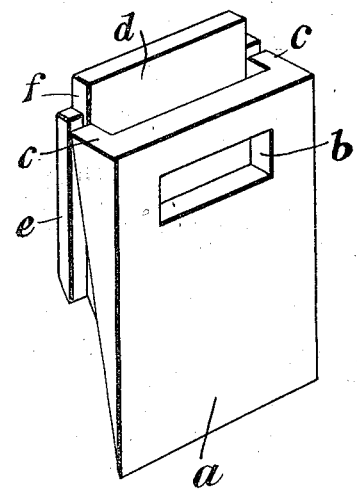

In the accompanying drawing wherein is shown by way of example a form of this invention, Figs. 1 and 2 are front and edge elevations respectively of the one part of the wedge device. Figs. 3 and 4 are front and edge elevations respectively, of the other part of the device. Fig. 5 is a fragmentary elevation of a tool handle showing in full lines the device in its functional position, that is to say driven into the one end of a handle in order to hold a tool member (not shown) fixed to the same; this figure also shows in dotted lines one of the parts of the device driven into the handle, so that the other part can be removed to facilitate removal of the tool member. Fig. 6 is a perspective view of the two elements of the fastening device removed.

Referring to the drawing in detail, one of the parts of the holding or wedge device shown consists of a plate $a$, which is provided at its lateral edges with ribs $c$, the height of which decreases towards the entering edge of the part, thus providing a wedge-shaped element.

The other part of the wedge device consists of a plate $d$, which rests against the ribs $c$ on the plate $a$ and is guided by them. In order to insure proper guidance of the plate $d$ by the ribs $c$, said plate is provided with lateral grooves $e$ into which the ridges engage. The plate $d$ is furthermore provided with recesses $f$ at the upper ends of the grooves $e$.

In the plate $a$ there is a recess or opening $b$ serving a purpose which will be hereinafter described.

The device described is employed in the following manner. After the one end of the handle, which end is suitably shaped, has been introduced into the hole made in the tool member, for instance a hammer head, the wedge-shaped device, consisting of the parts or plates $a$ and $d$, is driven to its functional position in the end of the handle, the plates then occupying the position shown in full lines in Fig. 5. If it is desired for any reason to separate the hammer head and the handle from one another, the plate $d$ is driven to the position shown in dotted lines in Fig. 5 and consequently the wedging action of the device is so reduced that the plate $a$ can easily be drawn out by means of a tool introduced into the recess or opening $b$, whereupon the hammer head and the handle can be separated from one another, either before or after the removal of the plate $d$.

Having now described my invention, what I claim as new and desire to secure by Letters Patent is:

1. A device of the character described comprising two independent wedge elements each having an entering edge and both being adapted to be driven to operative position in the end of a tool handle to maintain a tool in position thereon, one of the wedge elements being of less length than the other and being adapted, when it is desired to remove the tool from the handle, to be driven inwardly into the tool member to such depth as to permit the withdrawal of the other wedge element from the tool handle.

2. A device of the character described comprising a pair of wedging elements, one of said wedging elements including a body member provided with wedge-shaped flanges, the other wedging element being of less length than the first mentioned wedging element, and means on said last mentioned wedging element co-acting with said flanges whereby to guide the movement of the second mentioned wedging element, both wedging elements having entering edges adapted to facilitate their insertion into the end of a tool handle.

3. A device of the character described comprising a pair of wedging elements, one wedging element including a body, wedge-like ribs carried by the lateral extremities of the body, the other wedging element including a body having cut-away portions adapted to coact with the ribs of the first mentioned element whereby to guide the movement of the second mentioned wedging element relative to the first mentioned wedging element, and entering edges on both of said wedging elements.

In witness whereof I have hereunto set my hand in presence of two witnesses.

HELGE EFRAIM LJUNGQVIST.

Witnesses:
BASBIL LILLIEBORGS,
CARL O. SVENSSON.